Oct. 28, 1952 P. E. JEAN 2,615,809
COOKED TUBULAR ALIMENTARY COMPOSITION
Filed Dec. 7, 1949 2 SHEETS—SHEET 1
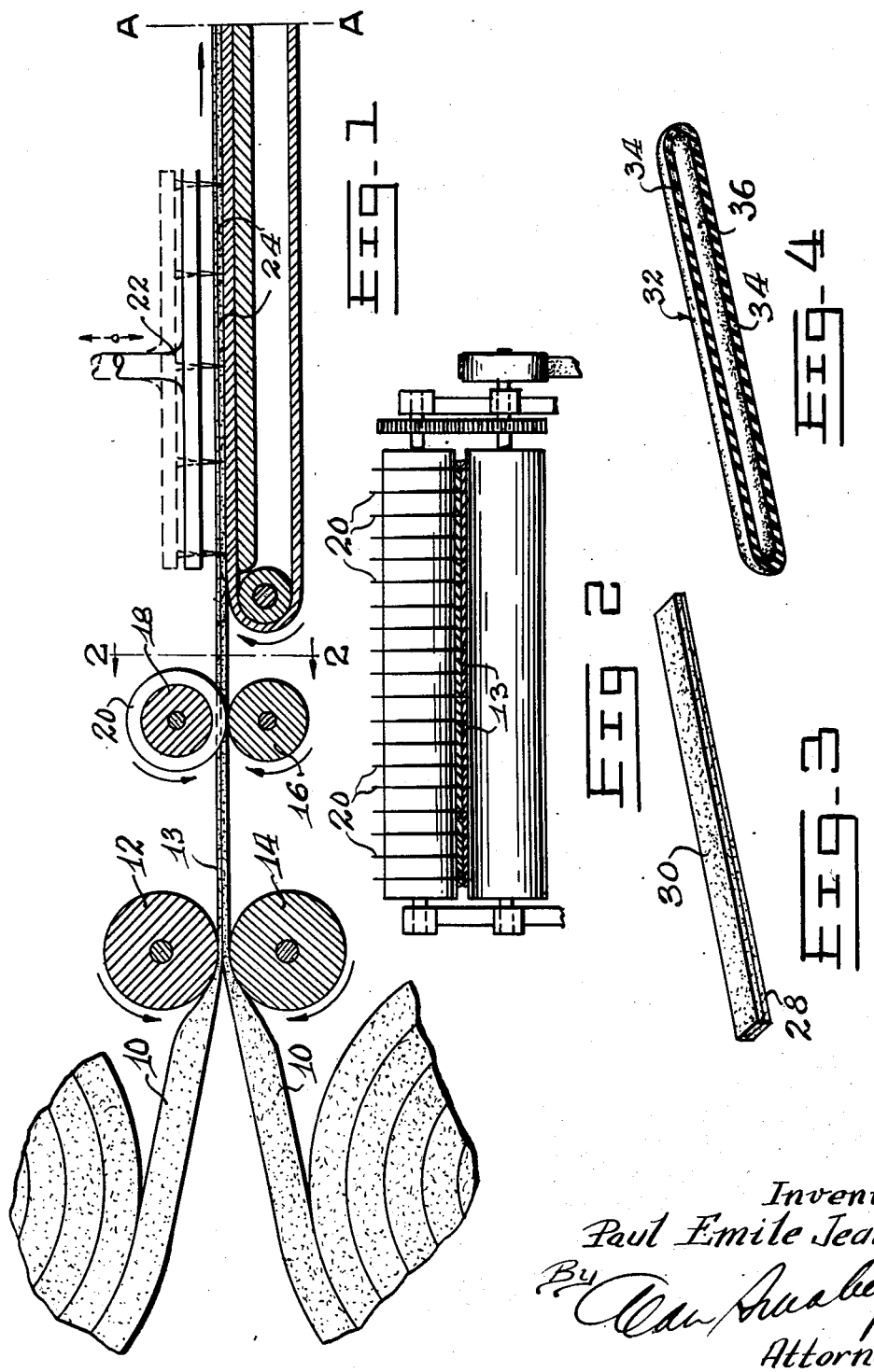
Inventor
Paul Emile Jean
By
Attorney Oct. 28, 1952            P. E. JEAN            2,615,809
COOKED TUBULAR ALIMENTARY COMPOSITION
Filed Dec. 7, 1949            2 SHEETS—SHEET 2
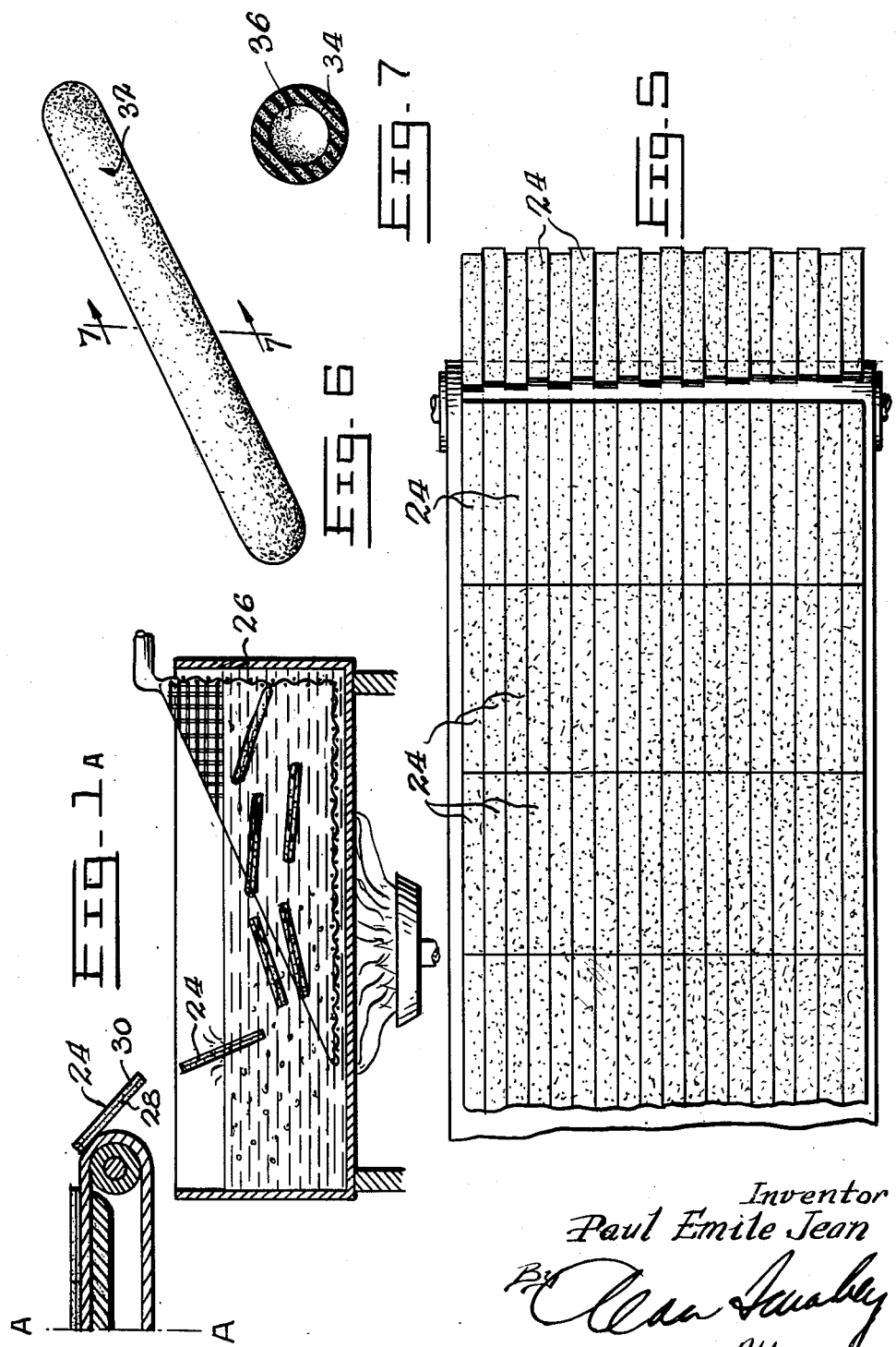
Inventor
Paul Emile Jean Patented Oct. 28, 1952

2,615,809

UNITED STATES PATENT OFFICE 2,615,809

COOKED TUBULAR ALIMENTARY COMPOSITION

Paul E. Jean, Montreal, Quebec, Canada, assignor to Cereal Food Products Company, Quebec City, Quebec, Canada Application December 7, 1949, Serial No. 131,603

1 Claim. (Cl. 99—85)

The present invention relates to the preparation of a cooked tubular alimentary paste product.

Prior art

Up to date alimentary pastes have been prepared commercially either by extrusion or by lamination of the dough. When preparing such pastes by the extrusion method the dough is pressed against a die from which it is expelled in the form of a tube. Depending upon the shape of the die the extruded paste will have the shape of macaroni or of spaghetti, or other known shapes.

Applicant's development

According to the present invention it has now been found that cooked tubular alimentary pastes of the so-called macaroni shape can be prepared by a lamination process in contra-distinction to the extrusion process.

In accordance with the present invention a cooked tubular alimentary paste is prepared by mixing a dough containing from about 27% to about 33% water and forming said dough into sheets by the action of press-rolls. At least two sheets of dough are then superimposed and laminated through press-rolls to express air and thus to avoid the formation of air space between the sheets and then submitted to the action of cutters to form elongated strips which are cut transversely into units to the desired length. The shearing action of the cutters pinches the marginal portions of the respective laminae together causing them to cohere. Thus both the proximate side marginal portions and the proximate and marginal portions of the respective laminae cohere forming tube-units with sealed ends. The units which have the edges of their laminae sealed by cohesion are then cooked in a bath of edible fatty material heated to a temperature of 160° C. to 240° C. for a period of about 10 to about 60 seconds. Due to the presence of the moisture contained in the dough and on its surface and to the fact that the cutters have caused cohesion between the edges of the strips formed by cutting the two superimposed sheets of dough and the high temperature of the bath of edible fatty material, there is an expansion of the moisture causing the laminae of the laminated units to separate intermediate their sealed edges thereby forming cooked alimentary paste tubes.

The dough which is used may be any of the conventional doughs obtained from one or more vegetable materials, for example, whole wheat, semolina, or wheat flour, and which are normally used for the preparation of alimentary pastes. When preparing the dough it is preferable to take steps to add from about 25% to about 33% of water, based on the total weight of the dough, with the preferred water content of about 29%. If desired, flavouring agents or materials, for example, grated cheese, or essence of cheese, or a seed, for example, celery seed, may be added to the dough.

Description

The present invention will be more fully understood by referring to the following drawings which illustrate the sequences in which the dough is manipulated to form the cooked tubular alimentary paste of the present invention and in which Figures 1 and 1A show the complete sequence followed in the preparation of the final product.

Figure 2 is a sectional view of Figure 1 along the line 2—2 showing the knives of the cutting apparatus.

Figure 3 is an enlarged view of a strip of dough which has not been cooked.

Figure 4 is a longitudinal sectional view of a cooked tubular alimentary paste.

Figure 5 is a top view of a laminated sheet of dough cut into strips of desired lengths.

Figure 6 shows a cooked tubular alimentary paste, and

Figure 7 is a cross sectional view along the line 7—7 of Figure 6.

Referring to Figure 1, two sheets of dough 10 having a thickness of about ¼ of an inch each are superimposed and passed together between press-rolls 12 and 14 to form a laminated sheet 13 of about 1/64 to about ⅛ of an inch in thickness. The laminated sheet 13 is then cut into elongated strips by passing through cutting rolls 16 and 18. The roll 18 is provided with cutting knives 20 which are spaced apart so as to cut the dough into strips having a width of about ¼ of an inch. The elongated strips are then cut to the desired length by passing through the cutoff apparatus 22.

The cutoff strips 24 are then cooked in a hot bath 26 of an edible fatty material. (See Figure 1A.)

An enlarged view of a strip 24 is shown in Figure 3 to illustrate in more detail the laminated structure wherein reference 28 is the lower lamina and reference 30 is the upper lamina. In Figure 4, there is shown a longitudinal cross section of treated strip 24 which is now referred to as a cooked tubular alimentary paste 32. The cooking of the laminated strip has caused the laminae 28 and 30 to separate so that tubular alimentary paste 32, when viewed in cross-section now has a tubular form having walls 34 with an inner space 36. As can be seen from this illustration it is now similar in appearance to a section of a piece of macaroni with the exception that the ends of the tubular product of the present invention are sealed.

The dough is kneaded through sets of pressing rolls which may be any of the conventional type commonly used in the industry of alimentary paste, to obtain products of the noodle type. Kneading is continued preferably until the dough has a consistency such that it could be used for noodles and passed through press-rolls which are adjusted to give a thickness of from about $1/64$ to about $1/8$ of an inch preferably of about $3/32$ of an inch. The laminated sheets of dough are left to stand for 10 to 30 minutes to permit the moisture content of the dough to come to the surface of the sheet. This is the normal step in working dough. The sheets are then passed through a set of cutters to form elongated strips. The cutters are adjusted so as to give strips having a width of from $5/32$ to about $1/2$ of an inch. The elongated strips are then cut to the desired length and passed into a bath of edible fatty material heated to a temperature of about 160° C. to about 240° C., preferably about 210° C. The preferred edible fatty materials which are used to carry out the present invention may be any of the well known edible vegetable or animal oils or fats, for example, olive oil or commercial shortening. The fatty material should be heated to a temperature just below its boiling point. It has been found that the cooking time required to allow the entrapped moisture to expand to form a tubular composition is from about 10 to about 60 seconds and preferably about 15 seconds, depending on the temperature of the bath of edible fatty material and the thickness and width of the strips of dough. The cooked product is then preferably maintained at a temperature of 150° C. long enough to eliminate and drain the excess of vegetable or animal oils or fats. The product is ready to be packaged and to be consumed.

Example

In order that the present invention may be more fully understood the following example is given in an illustrative sense and shows a preferred method of carrying out the invention.

7 lbs. of wheat flour or semolina (which is the purified millings of durum or other hard wheat used for the preparation of edible pastes or any other cereal), are mixed with 8 oz. of salt and about 32 ounces of water based on the total weight. The dough is mixed according to known processes for preparing alimentary pastes and formed into a homogeneous mass by passing through press-rolls whereby the dough is obtained in the form of sheets having a thickness of about $1/4$ of an inch. The sheets are rolled and left to stand for a few minutes to allow moisture in the dough to come to the surface of the sheet due to the exothermic reaction which takes place during the ageing of the dough. This is a normal step in working dough. Two of these rolled sheets are then superimposed and laminated through sets of press-rolls to a thickness of about $3/32$ of an inch and then cut to a width of about $1/4$ of an inch. The strips are then cut to the desired length. The strips are then ready to be submitted to the process of cooking by immersion in edible oils or fats heated to a temperature of about 210° C. for a period of about 15 seconds, whereby the entrapped moisture is expanded to form a tubular strip of macaroni shape. The cooked product is then taken out. The product has a tubular shape which is due to the quick evaporation of moisture contained in the center of the product.

I claim:

A process for the preparation of a cooked tubular alimentary paste product, comprising, preparing an alimentary paste dough containing from about 27% to about 33% water based on the total weight of the dough, forming the dough into elongated sheets, then continuously juxtaposing two such sheets and pressing them together by feeding them through press rolls whereby air is expressed from between the sheets and the sheets are thinned and laminated to form a composite sheet of two laminae of substantially even total thickness within the range from about $1/64$ of an inch to about $1/8$ of an inch, and then while feeding the composite sheet forward subjecting it to press-roll pressure and at laterally spaced-apart intervals to a shearing action along its length whereby the sheet is progressively divided lengthwise into a plurality of strips arranged side by side and whereby marginal proximate portions of the respective laminae of the strips are pinched together and thus caused to cohere lengthwise of the strips, and intermittently subjecting the plurality of strips simultaneously to a shearing action transversely of the sheet to separate lengths from the strips and to pinch proximate marginal portions of the ends of the respective laminae in each length together to cause their cohesion whereby elongated units are formed made up of two laminae joined together completely around their edges and containing substantially no entrapped air, and cooking said units in edible fat thereby causing the laminae of the laminated units to separate intermediate their connected edges thereby forming a hollow cooked tube of alimentary paste, and removing the cooked units from the fat and drying them.

PAUL E. JEAN.

REFERENCES CITED

The following references are of record in the file of this patent:

UNITED STATES PATENTS

| Number | Name | Date |
|---|---|---|
| 422,732 | Nuttall | Dec. 16, 1890 |
| 945,222 | Chong | Jan. 4, 1910 |
| 1,824,594 | Conforto | Sept. 22, 1931 |
| 2,002,053 | Doolin | May 21, 1935 |
| 2,165,718 | Mun | July 11, 1939 |
| 2,227,728 | Lombi | Jan. 7, 1941 |
| 2,338,588 | Kishlar | Jan. 4, 1944 |

OTHER REFERENCES

Allen, Mrs. Allen's Cook Book, page 166.